US006928578B2

(12) United States Patent
Archibald, Jr. et al.

(10) Patent No.: US 6,928,578 B2
(45) Date of Patent: Aug. 9, 2005

(54) SYSTEM, METHOD, AND COMPUTER PROGRAM FOR SELECTABLE OR PROGRAMMABLE DATA CONSISTENCY CHECKING METHODOLOGY

(75) Inventors: John Edward Archibald, Jr., Boulder, CO (US); Brian Dennis McKean, Longmont, CO (US)

(73) Assignee: International Business Machines Corporation, Armonk, NY (US)

(*) Notice: Subject to any disclaimer, the term of this patent is extended or adjusted under 35 U.S.C. 154(b) by 504 days.

(21) Appl. No.: 09/853,336

(22) Filed: May 10, 2001

(65) Prior Publication Data

US 2002/0169995 A1 Nov. 14, 2002

(51) Int. Cl.[7] ................................................ G06F 11/08
(52) U.S. Cl. ...................... 714/6; 714/758; 714/770; 711/114
(58) Field of Search ..................... 714/6, 758, 770; 711/114

(56) References Cited

U.S. PATENT DOCUMENTS

| | | | | |
|---|---|---|---|---|
| 5,504,858 A | | 4/1996 | Ellis et al. | 395/182.04 |
| 5,640,506 A | * | 6/1997 | Duffy | 714/6 |
| 5,819,109 A | | 10/1998 | Davis | 395/275 |
| 5,826,001 A | | 10/1998 | Lubbers et al. | 395/182.04 |
| 5,870,753 A | | 2/1999 | Chang et al. | 707/103 |
| 5,933,592 A | | 8/1999 | Lubbers et al. | 395/182.04 |
| 5,987,477 A | * | 11/1999 | Schmuck et al. | 707/201 |
| 5,991,542 A | | 11/1999 | Han et al. | 395/200.42 |
| 6,021,508 A | | 2/2000 | Schmuck et al. | 395/182.02 |
| 6,098,119 A | * | 8/2000 | Surugucchi et al. | 714/6 |
| 6,219,800 B1 | * | 4/2001 | Johnson et al. | 714/6 |
| 2003/0167439 A1 | * | 9/2003 | Talagala et al. | 714/6 |

FOREIGN PATENT DOCUMENTS

WO    WO 9938067 A1 * 7/1999  ............. G06F/3/06

\* cited by examiner

*Primary Examiner*—Robert Beausoliel
*Assistant Examiner*—Joseph D Manoskey
(74) *Attorney, Agent, or Firm*—Kunzler & Associates

(57) ABSTRACT

A data storage system that includes computer coupled to disk array controller which is coupled to data storage devices. First procedure provides a method to perform data consistency checking and correction of user data stored in data sectors on a data stripe. Each data sector includes data header and data stripe includes a parity sector, and parity sector includes a parity header. Data stripe is distributed across storage devices. Provides each data header with first code to provide a check for the user data stored in the data header's data segment, provides the parity header with second code to provide a check for a set of parity data stored in parity sector, and provides the parity header with third code by encoding each respective first code with second code. Third code enables user to check consistency of user data and parity data without respective operations on each byte of data in both data sectors and parity sector.

29 Claims, 5 Drawing Sheets

SYSTEM, METHOD, AND COMPUTER PROGRAM FOR SELECTABLE OR PROGRAMMABLE DATA CONSISTENCY CHECKING METHODOLOGY

FIELD OF THE INVENTION

The invention relates generally to systems and methods for performing data consistency checks on user data stored in a data storage subsystem; and more particularly, to systems, methods, and computer programs for performing user data consistency checks in a manner that where possible differentiates between corrupt user data and corrupt parity data and performs the data consistency check using less controller processor time and controller data storage resources as compared to conventional data consistency checking schemes.

BACKGROUND

In data processing systems, there is a need to maintain the validity and reliability of user data stored on data storage subsystems used by the data processing system. A technique for adding to the reliability of stored user data is to compute and store parity data that provides a check on user data that has previously been written to or otherwise stored on storage media. A further improvement may be obtained by distributing the user data across multiple data storage devices in a Redundant Array of Independent Disks (RAID). Providing parity data and storing data redundantly permits data that has been corrupted to be corrected, at least within some error detection and error correction parameters. A RAID subsystem typically includes a disk array controller that is in turn connected to a number of data storage devices, the subsystem being connected or connectable to one or more external computers or networks. A complete description of RAID may be found in The RAID Book, a Source Book for Disk Array Technology, Forth Edition, edited by Paul Massiglia, and published by the RAID Advisory Board, St. Peter, Minn., Sep. 1, 1994, copyright 1994 RAID Advisory Board, Inc. The purpose of a RAID is to provide redundancy to data stored by the computer (user data) to the data storage devices by regenerating, by the disk array controller, the stored user data when individual blocks of user data are corrupted or lost.

For example, in an exemplary RAID configuration having five data storage devices, user data is stored in four data sectors, each of four of the five data storage devices storing a respective data sector. Additionally, parity data providing some level of user data regeneration potential is stored in a fifth parity sector on the fifth data storage device. The four data segments (or data sectors) and the parity segment (or parity sector) comprise a data stripe (or sector stripe) in the RAID.

When a data consistency checks are to be made according to conventional techniques, such known data consistency checking techniques will read all data and parity sectors associated with a given data stripe to perform operations on each byte of data in those sectors to determine whether parity data stored for that data stripe is consistent with the user data stored in the stripe. Upon detecting an inconsistency, the system administrator typically has two options. The first option is to report the detected inconsistency without correcting the inconsistency. The second option is to correct the inconsistency by performing auto-correction, which includes a number of operations to attempt to restore the user data based on the parity data in the data stripe. Techniques for detecting and correcting errors to restore data are known in the art and not described in detail here.

Prior art data consistency checking techniques are limited in that they typically have no means or only limited means for determining whether the user data is corrupt or whether the parity data is corrupt when an inconsistency is identified. This limitation may result in erroneous data being stored in a data stripe when a data consistency check with an auto-correction is utilized. To illustrate such an erroneous result, consider that in some prior art techniques, upon detecting such an inconsistency, only the corresponding parity data is altered to make it consistent with the user data. In such techniques, having no other information, an assumption is made that the parity data has become corrupted rather than the user data. As a result, if the user data was actually corrupt, but not the parity data, the user data typically remains corrupt, and parity data consistent with the corrupt user data is written to the data stripe. What is needed is a system and method and computer program that can differentiate between corrupted parity data and corrupted user data, such that corrupted parity data is appropriately corrected in view of uncorrupted user data, and such that corrupted user data is corrected in view of uncorrupted parity data.

Yet another problem with known data consistency check techniques is that they are typically very time-consuming, especially in large data storage systems. Such known techniques typically operate on a burdensome amount of data to determine if parity data stored for a particular data stripe is consistent with corresponding user data. To perform a data consistency check, such prior art techniques not only read each byte of parity data in a data stripe, but also must perform exclusive-OR (XOR) operations on each byte of user data in each data sector in the data stripe. (User data is typically stored in 512 byte blocks. Data storage devices can be formatted to handle a variety of different sectors sizes, depending on the manufacturer and model of the data storage devices. Typical values for formatted sector sizes have conventionally been 512 bytes, 520 bytes, 524 bytes, and 528 bytes.

To illustrate this time-consuming computational burden, consider a volume set that consists of a 64 KB strip size with 16 data storage devices, a 512 byte segment size. A volume set is a disk array object that most closely resembles a single logical disk when viewed by the operating environment in host computer. A 64 KB stripe size means that 128 segments (sectors) of a data stripe are distributed on each disk drive). To perform data consistency checking, such conventional techniques typically perform XOR operations on 1048576 bytes of data. Such a large number of operations consume valuable disk array controller processing and data storage resources.

In light of the above, there remains desirability and need for a system and method that significantly reduce the number of bytes of data that must be operated on in a data stripe to determine whether parity stored the data stripe is consistent with the user data stored on the data stripe.

Somewhat related to the problem of the burdensome amount of time that conventional data consistency check techniques typically require, is the problem that such traditional techniques are typically not flexible enough to provide different data checking granularity to the data consistency checking procedure. For example, if stored data is mission critical financial information where misplacement of a decimal point could be catastrophic, more stringent data checking techniques may be desired. However, if the stored data is streaming video data where he is acceptable to experience a number of corrupted bits in the stored data, less stringent data checking techniques may be desired. Unfortunately, known data consistency checking techniques, regardless of the type of data being operated on, typically perform operations on each byte of user data to determine if such data inconsistencies exist, regardless of the type of data being checked. Therefore, there remains a need for system, method, apparatus, and procedure for a system or system administrator interacting with the system to define the desired granularity of data consistency checking, such that both the amount of processing time required to perform such checking on data that does not require stringent data checking and the amount of data storage resources typically required by a controller to perform such data checking is substantially reduced.

In addition, it will be appreciated that there remains a need for a system and method that permit and facilitate selection of a data checking methodology from amongst multiple levels of data checking, and more particularly for programmable data checking methodology that allows either the system or a system administrator interacting with the system to select from amongst multiple levels of data checking in accordance with the criticality of the data and the tolerance for errors in the data.

There also remains a need for a system and method for determining which of the host data or the parity data is erroneous or corrupted when a data inconsistency is identified, and for a system and method that use metadata in extended disk sector formatting to improve the efficiency or data checking and error detecting, and that can regenerate corrupted user data when such corrupted user data is determined.

SUMMARY

The present invention provides a number of benefits as compared to prior art data consistency check techniques. One advantage is that the invention can differentiate between corrupted parity data and corrupted user data, such that corrupted parity data is appropriately corrected in view of uncorrupted user data, and such that corrupted user data is corrected in view of uncorrupted parity data. Another advantage of the present invention is that it can efficiently perform data consistency check operations in a data storage system in a manner that reduces the number of operations typically performed on data by traditional data consistency check operations, resulting in substantially improved controller processing performance and reduced controller data storage requirements. Yet another advantage of the invention is that it allows a system administrator to define the granularity of data consistency checking, such that the system administrator can select a stringent or a less stringent data consistency checking methodology.

One aspect of the invention is implemented as a first procedure in a data storage system that includes a host computer coupled to a disk array controller, and where the disk array controller is coupled to one or more typically a plurality of data storage devices. The first procedure provides a method to perform data consistency checking and correction of user data stored in one or more data sectors on a data stripe. Each data sector includes a respective data header and the data stripe includes a parity sector. The parity sector includes a parity header. The data stripe is distributed across the data storage devices.

More particularly, in one embodiment, the first procedure first stores a respective first code into a respective data header for each respective data sector. The first code is derived from the user data stored in the data header's respective data segment. Next, the first procedure stores a second code into the parity header. The second code is derived from the parity data stored in the parity sector. Finally, the first procedure puts a third code into the parity header. The third code represents a value obtained by encoding the first code and the second code. The third code is used to check the consistency of the user data and the parity data without performing respective operations on each byte of data in both the data sectors and the parity sector.

In yet another aspect, the invention provides a second procedure that provides a user with a number of different levels of data consistency checking of user data stored in one or more data sectors on a data stripe distributed across a plurality of data storage devices in a data storage system. Each data sector includes a respective data header. The data stripe includes a parity sector that in turn includes a parity header. The data storage system also includes a host computer coupled to a disk array controller, where the disk array controller is coupled to the plurality of data storage devices. In one embodiment, the second procedure provides a number of different types of data consistency checking levels to a user. Next, the second procedure receives an indication of a selected type of the number of different types of data consistency checking levels. Finally, the second procedure, in response to receiving the selected type, performs a particular data consistency checking technique between the parity data and the user data based on the selected type.

In yet another aspect, the invention provides an apparatus for performing data consistency checking operations. The apparatus includes: (1) structure and procedure for coupling the apparatus to a computer; (2) structure and procedure for coupling the apparatus to a plurality of data storage devices; and, (3) a processor for fetching data and executing computer program instructions stored in a memory.

Embodiments of the computer program instructions include a data consistency checking procedure to first store a respective first code into each of a number of data headers. Each respective data header is part of a respective data segment. Each respective data segment comprises a data stripe, which is distributed across the plurality of data storage devices.

Next the procedure caches a second code into a parity header. The second code represents a set of parity data stored in a parity sector in the data stripe. The parity header is part of the parity sector, which in turn comprises the data stripe discussed above. Finally, the procedure puts a third code into the parity header. The third code represents an encoded value obtained by performing an operation on the first code and the second code. The third code is used to check the consistency of a set of user data and a set of parity data without the need to respective operations on each byte of data in both the data sectors and the parity sector. The user data is stored in the one or more data sectors. The parity data is stored in the parity sector.

DETAILED DESCRIPTION OF EMBODIMENTS OF THE INVENTION

Figure 1:
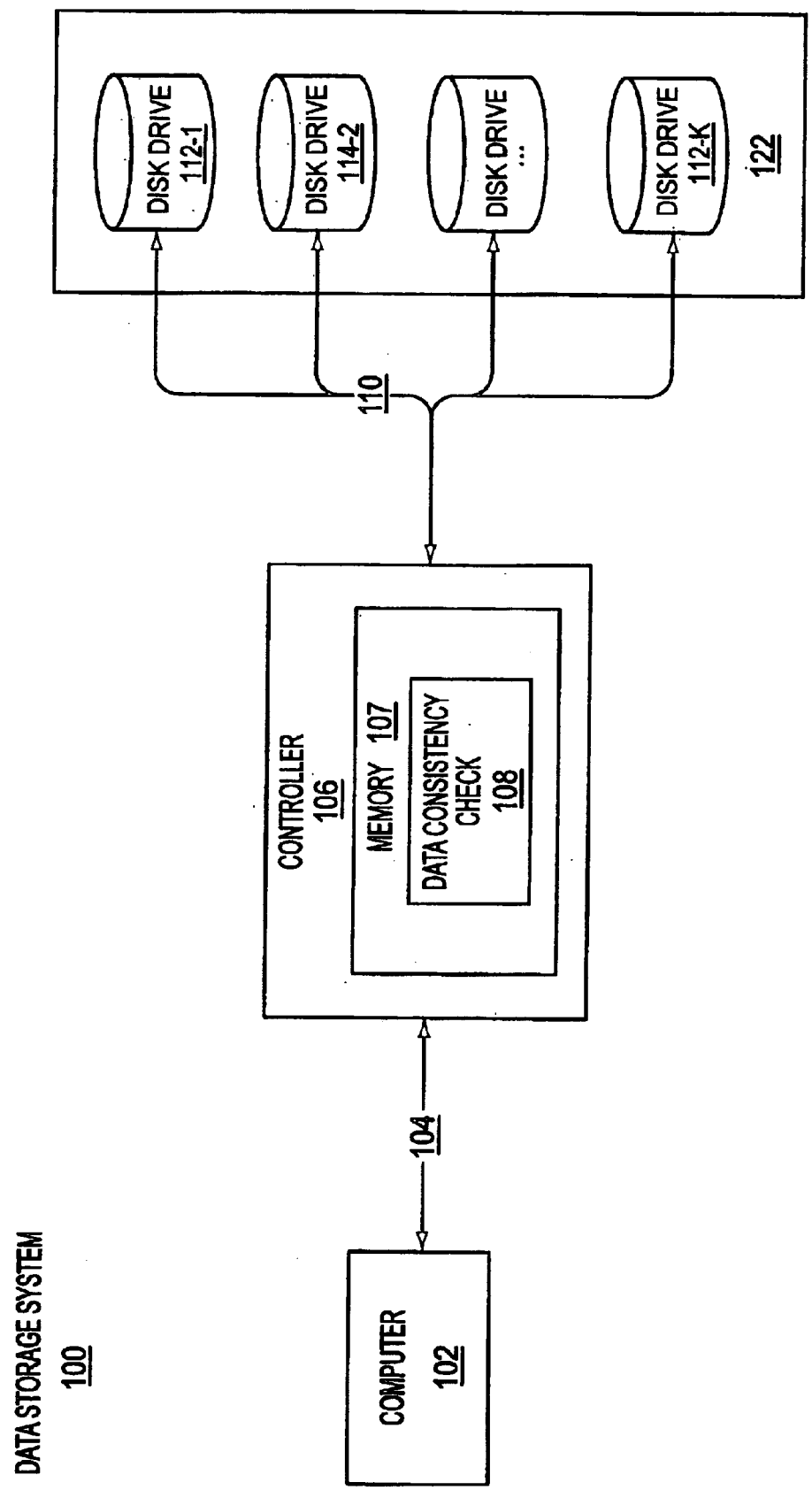
FIG. 1 is a block diagram that illustrates aspects of an exemplary data storage system according to one embodiment of the invention.

Referring to FIG. 1, there is a block diagram that illustrates aspects of a Redundant Array of Independent Disks (RAID) data storage system 100, according to one embodiment of the invention. System 100 includes computer 102 connected across I/O interface 104 to controller 106. Computer 102 is any type of computer having a processor (not shown) coupled to a memory (not shown) for fetching data and executing computer program instructions stored in the memory. Such computer program instructions are used to perform data I/O operations with respect to one or more disk drives 112-1 through 112-K I/O interface 104 can be any type of I/O interface, for example, a Small Computer Systems Interface (SCSI) I/O bus, a Fibre Channel bus, or other type of bus (e.g. Ethernet, IPI, HIPPI, Fire-Wire, USB, or IDE). SCSI I/O protocols are known in the art of computers and computer programming.

Controller 106 is a disk array controller for striping data to and from disk drives 112-1 through 112-K according to the particular RAID level being used in system 100. Various RAID levels are known in the art of configuring RAID data storage systems. Controller 106 includes a processor (not shown) for fetching data and computer program instructions stored in memory 107 to perform data consistency check operations 108, and to coordinate RAID operations across disk drives 112-1 through 112-K. Memory 107 can be any combination of a fast memory, such as a semiconductor random access memory (RAM), a fast non-volatile memory, such as read-only memory (ROM) for an erasable read-only memory EPROM, and a slow magnetic memory, such as a hard disk.

In one embodiment, data consistency task 108 is firmware, meaning that it is stored in nonvolatile memory and therefore available for execution soon as controller 106 is powered up. Data consistency task 108 procedures can also be implemented as conventional software that is stored on a hard disk (not shown), or other non-volatile memory, and is loaded into RAM or other fast memory for execution by the processor under control of an operating system (not shown). Aspects of exemplary procedures of data consistency check 108 are described in greater detail below in reference to FIG. 3.

Controller 106 is connected across I/O interface 110 to disk drives 112-1 through 112-K. I/O interface 110 can be any type of I/O interface, for example, a fibre channel interface or a SCSI interface. Disk drives 112-1 through 112-K represent any non-volatile, randomly accessible, rewritable mass storage device which has the ability of detecting its own storage failures. It includes both rotating magnetic and optical disks and solid-state disks, for non-volatile electronic storage elements, for example, PROMS, EPROMs, and EEPROMS.

From the perspective of computer 102, disk drive array 122 is divided into logical volumes, wherein each logical volume includes one or more stripes of data. Aspects of an exemplary data stripe 200 are described in greater detail below in reference to FIG. 2. Each logical volume begins at the same physical disk sector on all physical drives 112-1 through 112-N used by the logical volume. A particular data stripe 200 is addressed by its logical volume and logical block number.

Figure 2:
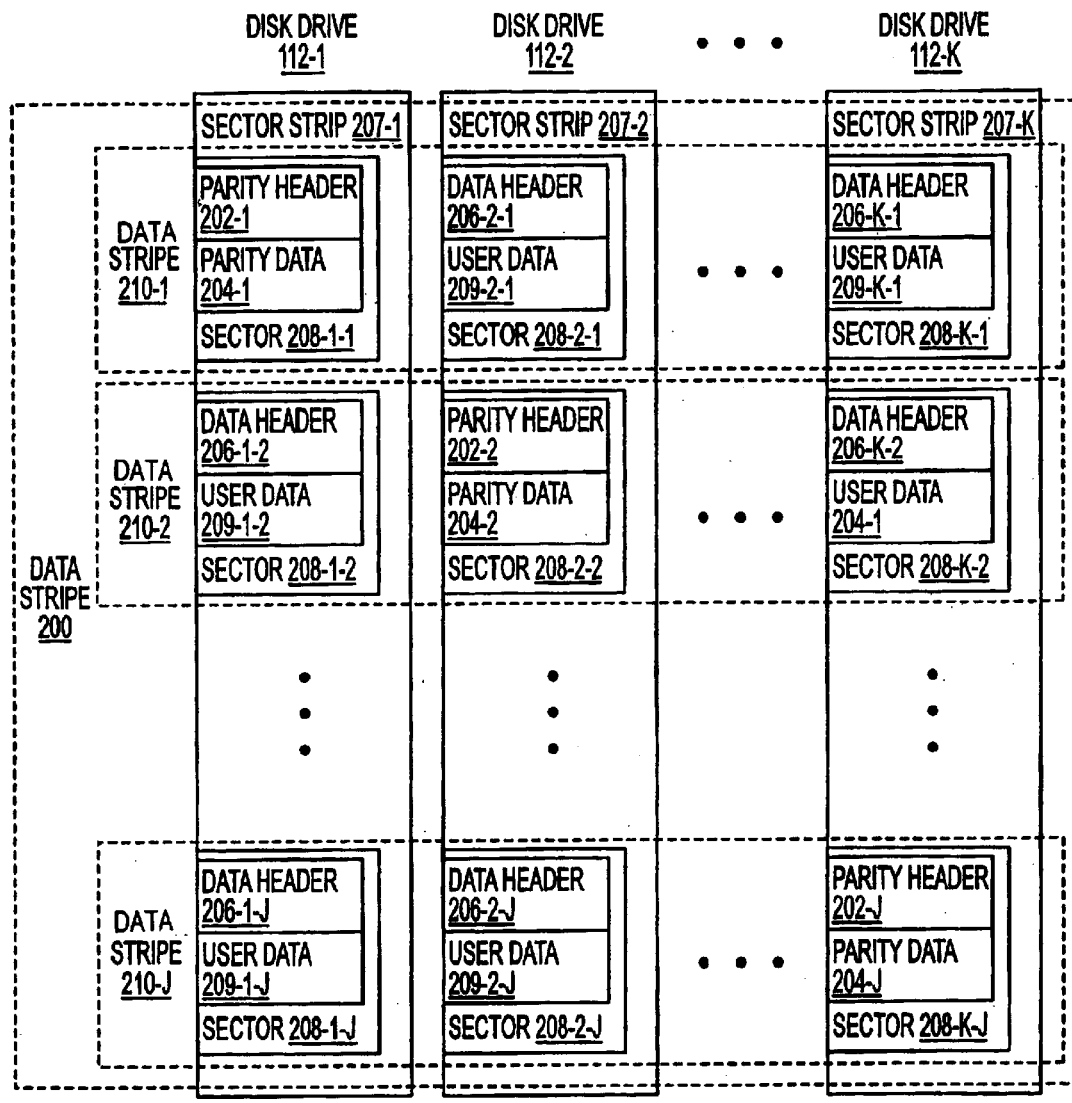
FIG. 2 is a block diagram that illustrates aspects of an exemplary data stripe according to one embodiment of invention.

The inventive data consistency check applies over the sector stripes, and by extension, over the entire data stripe. Multiple sectors make up a data stripe. Referring to FIG. 2, there is a block diagram that illustrates structure and organizational aspects of an exemplary data stripe 200 spanning a plurality of disk drives 112 (e.g. 112-1, 112-2, ..., 112-K) according to one embodiment of the invention. Stripe 200 comprises is a physical block of data written to each of the K data storage devices 112-1 through 112-K. A sector stripe 207 (e.g. 207-1, 207-2, ..., 207-K) comprises one parity sector and one data sector from each stripe. There is a parity sector and a header for each data sector and header in the sector stripe. The first physical block on each data storage device 112 are collectively considered to be the first data stripe 210-1. The second physical block on each disk drive or other data storage device 112 are collectively considered to be the second data stripe 210-2, and so on, for each subsequent physical block on the data storage devices 112-1 through 112-K.

First Data Stripe 210-1 includes a parity sector for storing data to re-generate host or user data stored in each data sector 208-1 through 208-N in data stripe 200. Each sector strip 207-1 through 207-K includes one of more data sectors 208-1 through 208-N. The number of data sectors 208-1 through 208-N in a sector strip 207-1 through 207-K depends on how the RAID has been configured. For example, a RAID configuration based on 8K sector strips 207-1 through 207-K results in 16 data sectors 208-1 through 208-N being included in each sector strip 207-1 through 207-N. Each respective sector strip 207-1 through 207-K is stored on a respective disk drive 112-1 through 112-K. For example, sector strip 207-1 is stored on disk drive 112, sector strip 207-2 is stored on disk drive 112-2, and the like.

As discussed above, traditional data consistency checking techniques are limited, both because they typically cannot determine if the user data stored in one or more data sectors 208-1 through 208-N is corrupt, and because they typically operate on a burdensome amount of data to perform such data consistency checks. The invention provides a solution to these prior art limitations by providing several of data check codes (DCC) metadata objects stored in parity header 202 and data headers 206-1 through 206-K. These data check codes and there usage are described in greater detail relative to FIG. 3 and FIG. 4.

Each data sector 208-1 through 208-N, includes a respective data header 206-1 through 206-K, as a result of extended sector formatting. Each respective data header 206-1 through 206-K includes a data check code sub-data sector ($DSS_{ds}$) metadata object derived from the user data stored in the respective data sectors 208-1 through 208-K. The one or more $DSS_{ds}$ values can be Longitudinal Redundancy Check (LRC) values, Cyclical Redundancy Check (CRC) values or Checksum Values. The $DCC_{ds}$ can include an arbitrary number of bytes, the number of bytes depending on the formula or procedure selected for generation of the $DCC_{ds}$. In a preferred embodiment, the one or more $DSS_{ds}$ values are LRC values. In a preferred embodiment, each respective $DCC_{ds}$ consists of two bytes of data. Parity sector 208 includes parity header 202 as a result of extended sector formatting. As is illustrated, data stripe 200 includes one parity sector 208 for each data sector in the stripe. Parity header 202 includes a data check code sub-parity sector ($DCC_{ps}$) value derived from the parity data stored in the parity sector 208. The $DSS_{ps}$ value can be Longitudinal Redundancy Check (LRC) values, Cyclical Redundancy Check (CRC) values or Checksum Values. In a preferred embodiment, the $DSS_{ps}$ value is an LRC value. In a preferred embodiments, the $DCC_{ps}$ consists of two bytes of data.

Parity header 202 also includes a data check code subsector stripe ($DCC_{ss}$) value derived from parity header 202 $DCC_{ps}$ value and the respective $DCC_{ds}$ values associated with the sectors. Such a representation can be formulated in a number of different ways. In one embodiment, the $DCC_{ss}$ is a summation of the $DCC_{ps}$ and the $DCC_{ds}$ values in the sector stripe. In the preferred embodiment, the $DCC_{ss}$ value is an XOR of the $DCC_{ps}$ value and the $DCC_{ds}$ values in the sector stripe. The $DCC_{ss}$ can include an arbitrary number of bytes. The greater number of bytes used to represent a $DCC_{ss}$, the greater the granularity of data consistency checking provided by the invention. In a preferred embodiments, the $DCC_{ss}$ consists of two bytes of data. Aspects of a procedure 300 utilizing a data stripe's 200 $DCC_{ps}$ values, $DCC_{ss}$ values, and $DCC_{ds}$ values to perform data consistency checking are described in greater detail herein elsewhere. The particular number of bytes described here are relative to particular embodiments and other numbers of bytes may be used in other embodiments.

Figure 3:
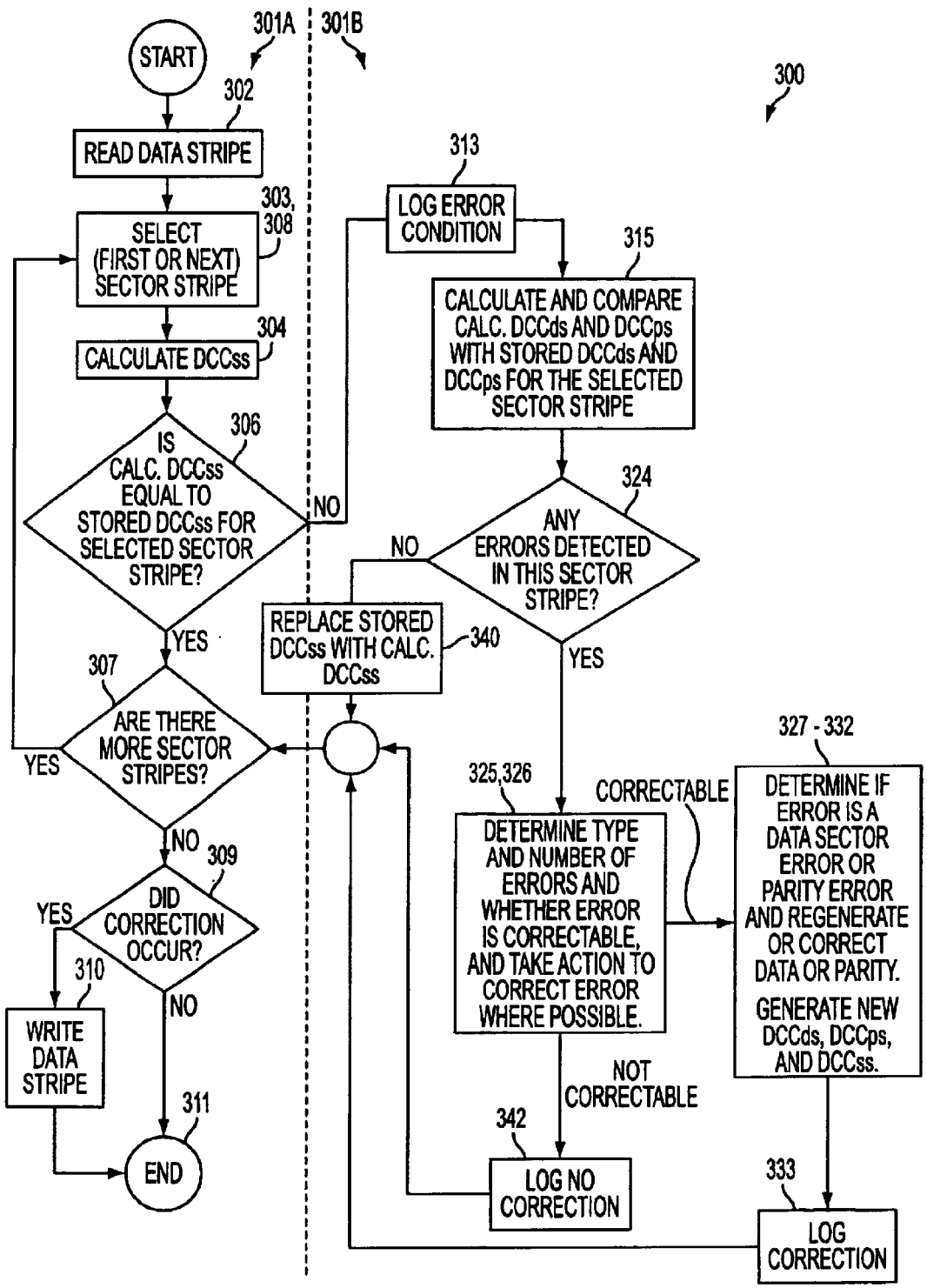
FIG. 3 is a flowchart diagram that illustrates aspects of a first embodiment of an exemplary procedure to perform data consistency checking operations according to one embodiment of the invention.
Figure 4:
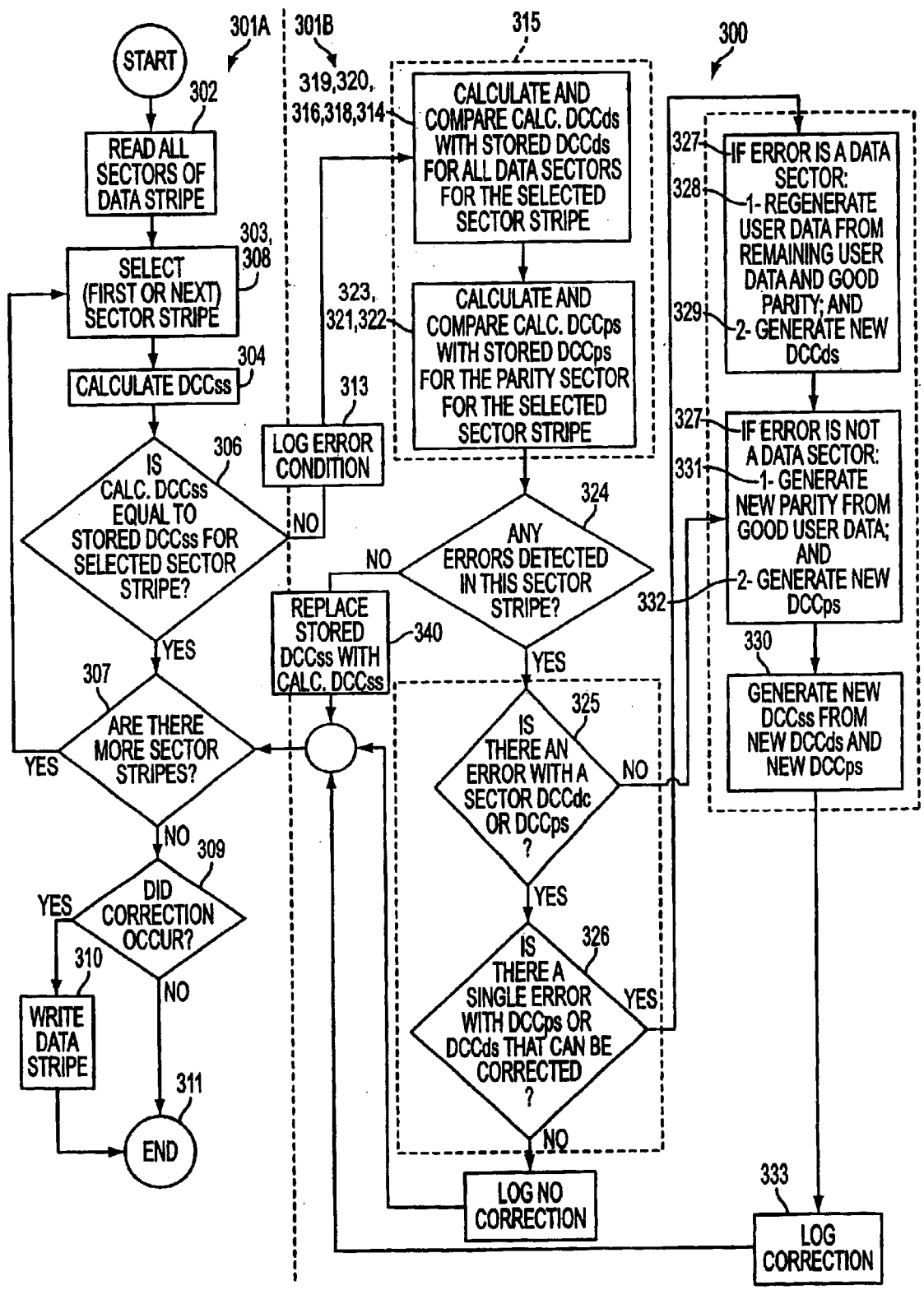
FIG. 4 is a flowchart diagram that illustrates aspects of a second embodiment of an exemplary procedure to perform data consistency checking operations according to another embodiment of the invention.

Embodiments of the inventive consistency checking procedure 300 are now described generally, and then relative to the illustrative flow chart diagrams in FIG. 3 and FIG. 4, where FIG. 4 illustrates additional procedural detail in an exemplary embodiment of the invention not provided in the embodiment of FIG. 3. The data consistency checking and correction procedure 300 may conveniently be divided into a data checking sub-procedure (301A) and a data inconsistency reporting and correcting sub-procedure (301B).

In the data checking portion, first, sectors (data sectors and parity sectors) of a data stripe are read. This reading may involve reading all data and parity sectors depending upon the granularity permitted (or desired) for regions of the data and parity. In one embodiment, all data and parity sectors are read. For each sector stripe, beginning with a first selected sector stripe, a data check code sub-sector stripe (DCCss) is calculated or otherwise generated for the selected sector stripe using the DCCds metadata for each data sector. Next, a comparison is made between the calculated DCCss and the previously stored DCCss to determine if they are the same. Recall that the calculated DCCss is the data check code calculated, computed, or otherwise generated based on the stored DCCds. The DCC metadata object stored in the sector header for each parity sector is an encoded representation of the DCCds stored in the sector header for each data sector in that sector stripe and the DCCps stored in the sector header of the parity sector in that sector stripe. The stored DCCss was written when the data and parity were originally stored. The calculated DCCss will be the same or equal to the stored DCCss when there has been no data corruption that would introduce inconsistencies. The DCCss generation and comparison operations are performed for each sector stripe, preferably in parallel or otherwise concurrently or with some overlap, and sequential processing for each sector stripe (such as might otherwise be inferred from the flow-chart diagrams) is not required. If no inconsistencies are detected across each sector stripe in the stripe, then the data check procedure is finished for that stripe.

If any inconsistencies are detected, the data inconsistency reporting and correcting sub-procedure is performed. This reporting and correction procedure is first briefly highlighted and then described in greater detail. The data stored in the sector body is used to generate: (i) a calculated DCCds for each data sector in the sector stripe, (ii) a calculated DCCps for the parity sector in the sector stripe, and (iii) a calculated DCCss for the sector stripe based on the newly calculated DCCds and DCCps. The newly calculated DCCds and stored DCCds for each data sector in the sector stripe are compared, as is the newly calculated DCCps compared to the stored DCCps for the parity sector. If an inconsistency is detected between a calculated DCCds and a stored DCCds for a data sector and auto correction for the user data in enabled, the user sector body of data for the affected sector is regenerated using the remaining good data and parity sector. Likewise, if an inconsistency is detected between a calculated DCCps and a stored DCCps, the parity data for parity sector is regenerated using the good host data stored in the stripe sector bodies. Optionally, but desirable each incident of a detected data or parity inconsistency are logged and/or reported so that corrective actions may be taken as appropriate. Finally, DCCds, DCCps, and DCCss objects for that sector stripe are regenerated from the now current user data and parity data so that all data, parity, and data check codes are current and consistent. As a further optional step, the newly generated data check code objects (calculated DCCds, DCCps, and DCCss) for that sector stripe may be compared to the previously stored data check code objects (stored DCCds, DCCps, and DCCss) for that sector stripe. This later step may be useful as an additional level of checking and for debugging, but is not usually required for actual implementations or deployments.

Attention is now directed to FIG. 3 and FIG. 4 which illustrate particular exemplary embodiments of data consistency checking and correction procedure 300. FIG. 4 provides somewhat greater detail as to certain procedural steps than FIG. 3. First, a data stripe is read (302) and a first sector stripe is selected (303). A DCCss is then generated for the selected sector stripe (304). Next, a comparison is made between the calculated DCCss and the stored DCCss (306) to determine if they are equal.

Recall that the calculated DCCss is the data check code calculated, computed, or otherwise generated based on the stored DCCds. The DCC metadata object stored in the sector header for each parity sector is an encoded representation of the DCCds stored in the sector header for each data sector in that sector stripe and the DCCps stored in the sector header of the parity sector in that sector stripe. The stored DCCss was written when the data and parity were originally stored. The calculated DCCss will be the same or equal to the stored DCCss when there has been no data corruption that would introduce inconsistencies.

A determination is made as to whether there are any more sector stripes to process (307), and if there are additional sector strips, the next sector stripe is retrieved for processing (308). The steps of generating the DCCss for the current sector stripe (304) and comparing the calculated DCCss with the stored DCCss for equality (306) are performed for each sector stripe until all the sector stripes for the particular data stripe have been processed. When there are no additional sector stripes to process, a determination is made as to whether any correction occurred (309). If no correction occurred, the procedure ends (311), otherwise if a correction occurred, the data stripe is written (310) and then the procedure ends (311).

In the comparing of whether the calculated DCCss is equal to the stored DCCss (306), if they are not equal, this indicates an error or corruption condition, and the error is optionally but advantageously logged (313). The calculated DCCds is calculated and compared with the stored DCCds for all data sectors for the selected (first or subsequent) sector stripe. In particular, a first (or subsequent) data sector is then selected (315) and a DCCds is generated (316) for that selected data sector. A determination is made as to whether the calculated DCCds is equal to the stored DCCds (318).

If the calculated DCCds is not equal to the stored DCCds, the error is optionally but preferably logged in a data sector error log (Step 319), and independent of whether the computed DCCds is equal to or unequal to the stored DCCds, a determination, test, or query is performed to determine whether there are any more data sectors in the sector stripe (320). If there are additional data sectors in the sector strip to process, the steps of generating the DCCds for the sector (316), calculating or otherwise determining or comparing the calculated DCCds with the stored DCCds for the current selected data sector (318), and optionally logging any errors (319) are performed for each data sector in the sector strip until all data sectors in that stripe have been processed (320), at which time, the DCCps is generated for the parity sector (321).

If the calculated DCCps is not equal to the stored DCCps, the error is optionally but advantageously logged in a parity sector error log (323). Then whether equal or not equal for that particular parity sector, a determination is made as to whether there are or were any errors in this sector stripe (324).

If there are no errors for this sector stripe, then the procedure replaces the stored DCCss with the calculated DCCss (340) and returns to process any more sector strips that may be present (307) in the manner described herein above. Otherwise, if there are errors in this sector stripe, the source of the error is determined before further action is taken (325). More particularly, a test is performed to determine if the error is with either a sector DCCds or with a sector DCCps. If the error is with one of the DCCds or the DCCps, then the number of errors becomes important. If there is one error with the DCCps and DCCds, the error may be correctable, however if there is more than one error (326) with the DCCps and DCCds, an uncorrectable error is optionally but preferably logged (342) and the procedure again tests of makes a comparison to determine if there are any more sector stripes to process (307) as already described herein above.

When there is only one error in either the DCCps or DCCds (326), the location of the error may be determined. If the error is in the data sector (327), then the data is regenerated from the remaining data and parity (328) and a new DCCds is generated (329). This is followed by generating a new DCCss (330) and correction of the error log(s) (333). If one the other hand, the error determined (327) is not in the data sector or the error is not an error with a sector DCCds or DCCps (325), then a new parity data is generated from user data (331) followed by generation of a new DCCps (332), generation of a new DCCss (330) and correction of the error log to reflect the status (333). Independent of whether the error was correctable (333) or uncorrectable (342), the procedure returns to determine whether there are any more sector stripes to process (307) and repeats the steps and procedures already described until all sector stripes have been processed and the procedure ends (311).

Notice that to determine data consistency using conventional data consistency check techniques in a volume set that consists of a 64 KB strip size (meaning that 128 segments (sectors) of a data stripe are distributed on each disk drive) with 16 data storage devices, and a 512 byte segment size, such conventional techniques typically perform XOR operations on 1048576 bytes of data. In contrast, the inventive checking and correction procedure 300 determines such data inconsistencies in a manner that operates on substantially fewer bytes of information.

For example, if the DCC codes described above relative to FIG. 2 are each implemented as four bytes of data, procedure 300 operates on four bytes of $DCC_{ds}$ metadata for each data sector 208-1 through 208-N in a sector strip 207-1 through 207-K per disk drive 112-1 through 112-N, and operates on an additional four bytes of $DCC_{ss}$ data stored in data stripe's 200 parity header 204. Using the same example previously used, procedure 300 operates on bytes of DCC metadata to determine consistency for an entire data stripe 200. This represents a reduction in a number of bytes that must be operated on per data stripe 200 to detect an inconsistency.

It is noted that in contrast to conventional systems and methods, where there is typically only one procedure used to perform data consistency checking operations, the invention permits selection of a degree of scrutiny or granularity to which data consistency checking may be performed. Recall that a first approach (referred to here as Level 1) reads all sectors (data and metadata) in the stripe, and calculates a parity value from the actual stored user data. Comparisons are made between the calculated parity value and the stored parity value. If an inconsistency is found to exist between the two, known methods are used to conditionally perform operations based on attributes of the data consistency check method and certain system parameters. This is Level 1 approach is a conservative approach.

Under a second level of checking (referred to here as Level 2), all sectors (data and metadata) are read in the stripe. The user data is written using an extended sector format and data check code (DCC) as already described. The DCC for each sector stripe is operated on to generate a calculated stripe DCC as described in detail above. The comparison with the stripe DCC is used to check the correctness of the data.

Under a third level of checking (Level 3), the inventive system and method are used with a stripe written indicator, that in one embodiment is provided by a field maintained in the metadata for each stripe. This stripe written indicator field is cleared on each stripe when the system drive is initialized, and set by storage device or array control procedures when the host (or other source) has written a sector in that stripe. Using this inventive structure and methodology, a first check is made as to the value or state of the stripe written indicator for the stripe. If the stripe written indicator is not set (cleared), then no further action is required for that stripe, and the data checking method may relinquish resources associated with that stripe. If the stripe written indicator indicates that the stripe was written, then the afore described Level 2 data check is performed on the data in that stripe.

As Level 3 provides for relatively rapid checking, it may be advantageously applied to very large system drives particularly if the degree of scrutiny that must be applied to the data is minimal. Such minimal scrutiny may for example, be appropriate for large volumes of video data. Level 1, providing for a high degree of scrutiny, may be most suitable for mission critical data where a single error may have severe consequences.

Figure 5:
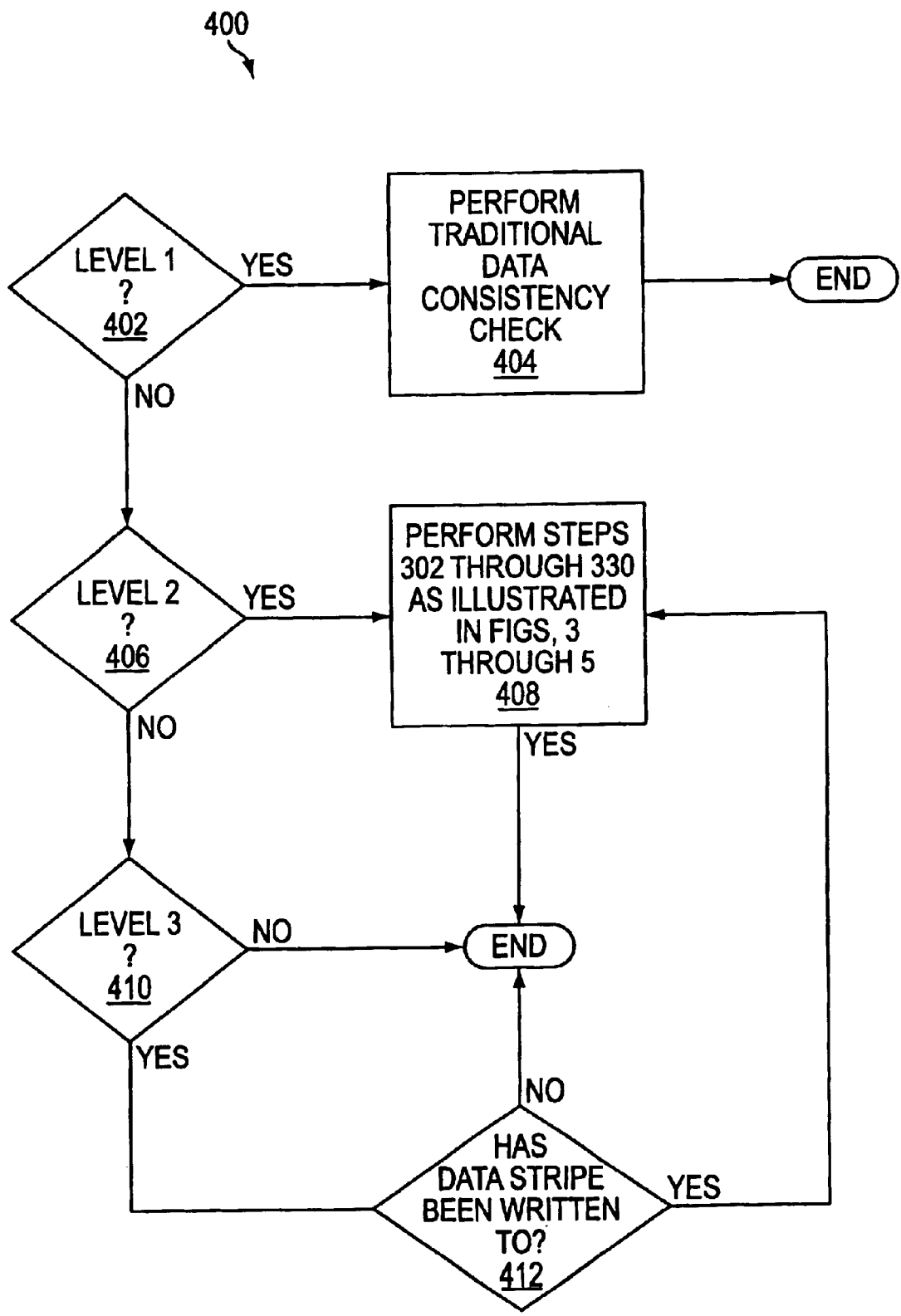
FIG. 5 is a flowchart diagram that illustrates aspects of an exemplary procedure for performing data consistency checking operations at different selectable levels according to one embodiment of the invention.

With respect to FIG. 5, there is illustrated an embodiment of a procedure which provides a system or system administrator, or a user with a number of different selectable checking levels (Levels 1, 2, or 3) or procedures to perform data consistency checking operations. By providing the user with a number of selectable levels of data consistency checking, the invention allows the user to fine-tune not only the amount of controller processing resources and controller data storage resources being used, but also allows the user to select a procedure that substantially reduces the amount of time required to perform the consistency checking operations as compared to the prior art.

In the illustrated embodiment there are different types, or levels of data consisting checking procedures. Procedure 400 starts by determine whether a first level was selected by the user (402), the first level being associated with traditional data consistency checking techniques. If so, procedure 400 applies traditional data consistency checking techniques (404). As discussed above, traditional data consistency checking techniques generally: (1) read all sectors (user data and any metadata) in data stripe 200, (2) calculates a parity value from the read user data, and, (3) compares the calculated parity value to the stored parity value. If inconsistency success between the two different parity values, known procedures are used to conditionally perform based on attributes of the data consistency check methodology and one or more data storage system parameters.

If the first level was not selected or specified, procedure 400 then determines if a second level was selected by the user (406), the second level being associated with the steps discussed above. If this intermediate level of checking was selected (408), procedure 400 performs the appropriate procedural steps as described above to check and where required and possible to correct the data.

In the event that neither the first or second levels were selected, the procedure 400 determines if a third level was selected (410), the third level corresponding to a procedure that only performs a data consistency check on the user data in data stripe 200 if user data has been written to data stripe 200 since a last data consistency check operation has been performed on data stripe 200. If the third global was selected (410), the procedure 400 determines (412) whether user data has been written to data stripe 200 since a last data consistency check was performed on the user data in data stripe 200.

There are a number of ways to accomplish this. In one embodiment, a stripe written indicator data element (not shown) is stored in parity header 202 (see FIG. 2). The data element is initialized to indicate that data stripe 200 has not been written to upon initialization of a storage volume distributed across disk drives 112-1 through 112-N (see FIG. 1). The data element is set to indicate that data stripe 200 has been written to whenever computer 102 writes user data to stripe 200. When either procedure 300 or 400 is performed, the data element is set to indicate that it is not necessary to perform a data consistency check on data stripe 200. If user data has been written to data stripe 200 (412), procedure 400 continues (408) as described in greater detail above.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings.

All publications, patents, and patent applications mentioned in this specification are herein incorporated by reference to the same extent as if each individual publication or patent application was specifically and individually indicated to be incorporated by reference.

We claim:

1. In a data storage system that includes a host computer coupled to a disk array controller that is in turn coupled to a plurality of data storage devices, a method providing improved data consistency checking and correction of user data stored in one or more data sectors on a data stripe, each data sector including a respective data header, the data stripe including a parity sector that in turn includes a parity header, the data stripe being distributed across the data storage devices, the method comprising:

for each data header, storing a respective first code into the data header that represents the user data stored in the data header's respective data segment;

storing a second code into the parity header, the second code representing a set of parity data stored in the parity sector; and, storing a third code into the parity header, the third code representing a value obtained by encoding the first code and the second code, the third code being used to check the consistency of the user data and the parity data without performing respective operations on each byte of data in both the data sectors and the parity sector.

2. The method of claim 1, wherein:

(a) in the first code storing, each respective first code is a data check code sub-data sector ($DCC_{ds}$) code;

(b) in the second code storing, the second code is a data check code sub-parity sector ($DCC_{ps}$) code; and, (c) in the third code storing, the third code is a data check code sub-sector ($DCC_{ss}$).

3. The method of claim 1, further comprising:

determining if the user data is corrupt, the determining comprising steps of:

reading the parity data and the user data;

for each respective data segment of the data segments:

(a) providing a calculated first code based on the user data stored in the respective data segment;

(b) comparing the calculated first code to the first code to determine if the stored user data is corrupt;

(c) if the user data is corrupt, regenerating the corrupt user data using certain other data sectors of the data sectors and the parity data; and, (d) storing the regenerated user data in the respective data segment, the regenerated user data replacing the corrupt user data.

4. The method of claim 3, further comprising:

for each respective data sector of the data sectors:

(a) if the user data in the respective data sector is corrupt, generating a new first code from the regenerated user data; and, (b) storing the new first code to the respective data sector's respective data header, the new first code replacing the first code.

5. The method of claim 4 further comprising:

generating a new DCCss from the second code and each respective first code; and;

storing the new DCCss in the parity header, the new DCCss replacing the third code.

6. The method of claim 1, further comprising:
determining if the parity data is corrupt, the determining comprising:
(a) providing a calculated DCCps based on the parity data;
(b) comparing the calculated DCCps to the DCCps to determine if the parity data is corrupt; and,
(c) if the parity data is corrupt, regenerating the corrupt parity data from the user data; and,
(d) storing the regenerated parity data to the parity sector, the regenerated parity data replacing the corrupt parity data.

7. The method of claim 6, further comprising:
if the parity data is corrupt, generating a new DCCps from the regenerated parity data; and,
storing the new DCCps to the parity header, the new DCCps replacing the DCCps.

8. The method of claim 3 further comprising:
generating a new DCCss from the second code and each respective first code; and;
storing the new DCCss in the parity header, the new DCCss replacing the third code.

9. The method of claim 8, further comprising, if the new DCCss is not equal to the third code, reporting the inconsistency in the data stripe to a system administrator.

10. The method of claim 1, further comprising:
calculating a new DCCss from each respective first code and the second code; and, comparing the new DCCss to the DCCss to determine if there is an inconsistency between the user data and the parity data.

11. The method of claim 1, further comprising:
before reading, locking after the step of storing and before the step of performing, by the disk array controller, the data stripe to prevent a different entity as compared to the disk array controller from performing input/output operations on the data stripe; and,
after providing a data check code sub-sector, unlocking after performing the data stripe to allow the different entity to perform input/output to the data stripe.

12. A computer program product for use in conjunction with a processor, the computer program product comprising a first computer readable storage medium and a computer program mechanism embedded therein, the computer program mechanism comprising a data consistency checking procedure to determine inconsistencies between parity data and user data stored in a stripe of data distributed across a plurality of data storage devices in a data storage system, the parity data being stored in a parity sector, the parity sector including a parity header, the user data being stored in one or more data sectors, each respective data sector of the data sectors including a data header, the data consistency checking procedure including instructions for:
for each data header, storing a respective first code into the data header that represents the user data stored in the data header's respective data segment;
caching a second code into the parity header, the second code representing a set of parity data stored in the parity sector; and,
putting a third code into the parity header, the third code representing a value obtained by encoding the first code and the second code, the third code being used to check the consistency of the user data and the parity data without performing respective operations on each byte of data in both the data sectors and the parity sector.

13. The computer program product of claim 12, wherein the data consistency checking procedure further including instructions for: processing said first code and said second code to check stripes.

14. An apparatus for performing data consistency checking operations, the apparatus comprising:
a first communications link coupling the apparatus to a computer;
a second communications link coupling the apparatus to a plurality of data storage devices;
a processor for fetching data and executing computer program instructions stored in a memory, the computer program instructions comprising a data consistency checking procedure for:
storing a respective first code of one or more first codes into a set of data headers in one or more data segments, the data segments being located in a data stripe distributed across the plurality of data storage devices, the first code representing a set of user data stored in the data header's respective data segment;
providing a parity header with a second code to represent a set of parity data stored in a parity sector in the data stripe, the parity header being part of the parity sector; and
providing the parity header with a third code by encoding each respective first code with the second code; such that the third code can be used to check the consistency of a set of user data and a set of parity data without the need to respective operations on each byte of data in both the data sectors and the parity sector, the user data being stored in the one or more data sectors, the parity data being stored in the parity sector.

15. A system for performing data consistency checking, the system comprising:
a computer for sending a data consistency check request to a controller, the computer being coupled to the controller, the controller being responsive to the receipt of the request, the request pertaining to checking for differences between a set of parity data and a set of user data stored in a data stripe distributed across a plurality of data storage devices coupled to the controller;
a procedure stored in a memory coupled to the controller, the procedure for:
storing a respective first code of one or more first codes into a set of data headers in one or more data segments, the data segments being part of the data stripe, the first code representing at least a subset of the user data stored in the data header's respective data segment;
caching a second code into a parity header, the first code representing a set of parity data stored in a parity sector in the data stripe, the parity header being part of the parity sector; and
putting a third code into the parity header, the third code being obtained by encoding the first code with the second code, the third code being used to check the consistency of a set of user data and a set of parity data without the need to respective operations on each byte of data in both the data sectors and the parity sector, the user data being stored in the one or more data sectors, the parity data being stored in the parity sector.

16. The method of claim 15, wherein the particular data consistency checking technique comprises:
  reading data in the data stripe; and,
  performing operations on each byte of data both in the parity sector and each respective data sector to determine if there is a difference between the parity data and the user data.

17. In a data storage system that includes a host computer coupled to a disk array controller that is in turn coupled to a plurality of data storage devices, a method providing a user with a number of different levels of data consistency checking techniques, the data checking techniques to be performed on user data stored in one or more data sectors on a data stripe, each data sector including a respective data header, the data stripe including a parity sector that in turn includes a parity header, the data stripe being distributed across the data storage devices, the method comprising:
  providing a number of different types of data consistency checking levels to a user;
  receiving an indication of a selected type of the number of different types of data consistency checking levels; and,
  performing a particular data consistency checking technique between the parity data and the user data based on the selected type.

18. The method of claim 17, wherein said performing is performed if there is user data stored in the data stripe and if the stored user data has been modified since a last data consistency check operation has been performed between the user data and the parity data.

19. The method of claim 18, wherein the particular data consistency checking technique comprises:
  reading data in the data stripe;
  generating a calculated third code from a stored second code in the parity header and from a set of stored first code values, a respective first code value of the set of first code values being stored in each respective data header of the data stripe; and,
  comparing the calculated third code to a stored third code in the parity header, such that the comparison identifies whether there the user data is inconsistent with the parity data without the need to perform respective operations on each byte of data in both the data sectors and the parity sector.

20. The method of claim 17, wherein the particular data consistency checking technique comprises:
  reading data in the data stripe;
  generating a calculated third code from a stored second code in the parity header and from a set of stored first code values, a respective first code value of the set of first code values being stored in each respective data header of the data stripe; and,
  comparing the calculated third code to a stored third code in the parity header, such that the comparison identifies whether there the user data is inconsistent with the parity data without the need to perform respective operations on each byte of data in both the data sectors and the parity sector.

21. A computer program product for use in conjunction with a processor, the computer program product comprising a first computer readable storage medium and a computer program mechanism embedded therein, the computer program mechanism comprising a data consistency checking procedure to determine inconsistencies between parity data and user data stored in a stripe of data distributed across a plurality of data storage devices in a data storage system, the parity data being stored in a parity sector, the parity sector including a parity header, the user data being stored in one or more data sectors, each respective data sector of the data sectors including a data header, the data consistency checking procedure including instructions for:
  providing a number of different types of data consistency checking levels to a user;
  receiving an indication from the user of a selected type of the number of different types of data consistency checking levels; and,
  performing a particular data consistency checking technique between the parity data and the user data based on the selected type.

22. An apparatus for providing a user with a number of different levels of data consistency checking techniques, the apparatus comprising:
  a first communications channel for coupling the apparatus to a computer;
  a second communications channel coupling the apparatus to a plurality of data storage devices;
  a processor for fetching data and executing computer program instructions stored in a memory, the computer program instructions comprising a data consistency checking procedure for:
    providing a number of different types of data consistency checking levels to a user;
    receiving an indication of a selected type of the number of different types of data consistency checking levels; and,
    performing a particular data consistency checking technique between the parity data and the user data based on the selected type.

23. A method for checking data consistency of data stored in one or more data sectors of a data stripe, each data sector including a respective data header, the data stripe including a parity sector that includes a parity header, the method comprising:
  for each data header, storing a respective first code in the data header that represents the user data stored in the data header's respective data segment;
  storing a second code into a parity header, the second code representing a set of parity data stored in a parity sector; and,
  storing a third code into the parity header, the third code representing a value obtained by encoding the first code and the second code, the third code being used to check the consistency of the user data and the parity data.

24. The method of claim 23, wherein said consistency checking is performed without performing respective operations on each byte of data in both the data sectors and the parity sector.

25. The method of claim 23, wherein:
  (a) each respective first code comprises a data check code sub-data sector ($DCC_{ds}$) code;
  (b) the second code comprises a data check code sub-parity sector ($DCC_{ps}$) code; and,
  (c) the third code comprises a data check code sub-sector ($DCC_{ss}$).

26. The method of claim 23, further comprising determining if the user data is corrupt, wherein the determining comprises:
  reading the parity data and the user data; and
  for each respective data segment:
    (a) providing a calculated first code based on the user data stored in the respective data segment;

(b) comparing the calculated first code to the first code to determine if the stored user data is corrupt;

(c) if the user data is corrupt, regenerating the corrupt user data using certain other data sectors of the data sectors and the parity data; and, (d) storing the regenerated user data in the respective data segment, the regenerated user data replacing the corrupt user data.

27. The method of claim 26, further comprising:

for each respective data sector:

(a) if the user data in the respective data sector is corrupt, generating a new first code from the regenerated user data; and, (b) storing the new first code to the respective data sector's respective data header, the new first code replacing the first code.

28. A method for checking data consistency of data stored in one or more data sectors of a data stripe, each data sector including a respective data header, the data stripe including a parity sector that includes a parity header, the method comprising:

for each data header, storing a respective first code comprises a data check code sub-data sector code in the data header that represents the user data stored in the data header's respective data segment;

storing a second code comprises a data check code sub-parity sector code into a parity header, the second code representing a set of parity data stored in a parity sector; and, storing a third code a data check code sub-sector into the parity header, the third code representing a value obtained by encoding the first code and the second code, the third code being used to check the consistency of the user data and the parity data without performing respective operations on each byte of data in both the data sectors and the parity sector;

determining if the user data is corrupt, the determining comprising: reading the parity data and the user data; and for each respective data segment: (a) providing a calculated first code based on the user data stored in the respective data segment; (b) comparing the calculated first code to the first code to determine if the stored user data is corrupt; (c) if the user data is corrupt, regenerating the corrupt user data using certain other data sectors of the data sectors and the parity data; and, (d) storing the regenerated user data in the respective data segment, the regenerated user data replacing the corrupt user data; and for each respective data sector: (a) if the user data in the respective data sector is corrupt, generating a new first code from the regenerated user data; and, (b) storing the new first code to the respective data sector's respective data header, the new first code replacing the first code.

29. A computer program product for use in conjunction with a processor, the computer program product comprising a first computer readable storage medium and a computer program mechanism embedded therein, the computer program mechanism comprising a data consistency checking procedure to determine inconsistencies between parity data and user data stored in a stripe of data distributed across a plurality of data storage devices in a data storage system, the parity data being stored in a parity sector, the parity sector including a parity header, the user data being stored in one or more data sectors, each respective data sector of the data sectors including a data header, the data consistency checking procedure including instructions for:

for each data header, storing a respective first code comprises a data check code sub-data sector code in the data header that represents the user data stored in the data header's respective data segment;

storing a second code comprises a data check code sub-parity sector code into a parity header, the second code representing a set of parity data stored in a parity sector; and, storing a third code a data check code sub-sector into the parity header, the third code representing a value obtained by encoding the first code and the second code, the third code being used to check the consistency of the user data and the parity data without performing respective operations on each byte of data in both the data sectors and the parity sector;

determining if the user data is corrupt, the determining comprising: reading the parity data and the user data; and for each respective data segment: (a) providing a calculated first code based on the user data stored in the respective data segment; (b) comparing the calculated first code to the first code to determine if the stored user data is corrupt; (c) if the user data is corrupt, regenerating the corrupt user data using certain other data sectors of the data sectors and the parity data; and, (d) storing the regenerated user data in the respective data segment, the regenerated user data replacing the corrupt user data; and for each respective data sector: (a) if the user data in the respective data sector is corrupt, generating a new first code from the regenerated user data; and, (b) storing the new first code to the respective data sector's respective data header, the new first code replacing the first code.

* * * * *